(12) United States Patent
Kwon et al.

(10) Patent No.: US 11,974,004 B2
(45) Date of Patent: Apr. 30, 2024

(54) DISPLAY DEVICE AND OPERATING METHOD THEREOF

(71) Applicant: LG ELECTRONICS INC., Seoul (KR)

(72) Inventors: Miyeon Kwon, Seoul (KR); Kyungryun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/826,109

(22) Filed: May 26, 2022

(65) Prior Publication Data

US 2023/0291956 A1 Sep. 14, 2023

(30) Foreign Application Priority Data

Mar. 8, 2022 (KR) .................. 10-2022-0029138

(51) Int. Cl.
*H04N 21/422* (2011.01)
*H04N 21/41* (2011.01)
*H04N 21/4363* (2011.01)

(52) U.S. Cl.
CPC . *H04N 21/42225* (2013.01); *H04N 21/41265* (2020.08); *H04N 21/42221* (2013.01); *H04N 21/43635* (2013.01)

(58) Field of Classification Search
CPC ....... H04N 21/42225; H04N 21/41265; H04N 21/42221; H04N 21/43635; H04N 21/42226
USPC .......................................................... 348/734
See application file for complete search history.

(56) References Cited

U.S. PATENT DOCUMENTS

2002/0070873 A1\* 6/2002 Davies ................. G05B 19/042
340/12.3
2022/0172603 A1\* 6/2022 Hatambeiki .......... H04W 12/48

\* cited by examiner

*Primary Examiner* — John W Miller
*Assistant Examiner* — Omer Khalid
(74) *Attorney, Agent, or Firm* — LEE, HONG, DEGERMAN, KANG & WAIMEY

(57) ABSTRACT

A display device according to an embodiment of the present disclosure may obtain information on one or more control methods supported by an external device, select a first control method according to a predetermined priority based on the obtained information, and switch the first control method to a second control method having a next priority according to a change in a control situation.

14 Claims, 12 Drawing Sheets

| TYPE | (SUPPORTED) CONTROL METHOD | | | CONTROL METHOD (PRIORITY) | IP CONTROL SETTING PROCESS | TARGET DEVICE |
|---|---|---|---|---|---|---|
| | CEC | IP | IR | | | |
| STB | X | O | O | ~~CEC~~ > IP > IR | KEY TEST | TV A |
| | X | O | O | ~~CEC~~ > IP > IR | PIN CODE SETTING | TV B |
| OTT | O | X | X | CEC > ~~IP~~ > ~~IR~~ | NONE | TV C |
| | X | O | X | ~~CEC~~ > IP > ~~IR~~ | KEY TEST | Stick A |
| | O | O | X | CEC > IP > ~~IR~~ | PIN CODE SETTING | Stick B |
| | O | O | O | CEC > IP > IR | | TV D |

DISPLAY DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2022-0029138, filed on Mar. 8, 2022, the contents of which are hereby incorporated by reference herein in its entirety.

BACKGROUND OF THE INVENTION

The present disclosure relates to a display device and, more particularly, to a display device for controlling operation of an external device.

DISCUSSION OF THE RELATED ART

Digital TV services using wired or wireless communication networks are becoming common. Digital TV services may provide various services which cannot be provided by the existing analog broadcast service.

For example, Internet protocol television (IPTV) and smart TV services which are types of digital TV services provide interactivity to allow user to actively select a type of a program to be watched, a viewing time, etc. The IPTV and smart TV services may provide various additional services, such as Internet search, home shopping, online games and external device control, based on such interactivity.

There are three methods of connecting a TV to an external device to control the external device using a remote controller, such as high definition multimedia interface-consumer electronics control (HDMI-CEC) method, an infrared (IR) method and an Internet protocol (IP) method.

Since the type of recognizing and controlling the external device varies according to the method, when a problem occurs in control of the external device in a state of setting one method, the problem continues unless another method is set.

To this end, when a problem occurs in control of the external device in a state of setting one method, a user shall re-set another method.

SUMMARY OF THE INVENTION

An object of the present disclosure is to reduce failure cases in control of an external device in various customer environments in consideration of advantages and disadvantages of each method of controlling the external device.

Another object of the present disclosure is to dynamically switch a control method such that an external device is able to be controlled by changing to another method without user manipulation when an unexpected situation occurs and the external device cannot be controlled.

A display device according to an embodiment of the present disclosure may obtain information on one or more control methods supported by an external device, select a first control method according to a predetermined priority based on the obtained information, and switch the first control method to a second control method having a next priority according to a change in a control situation.

A display device according to an embodiment of the present disclosure may comprise an external device interface configured to provide a high definition multimedia interface-consumer electronic control (HDMI-CEC) function with an external device, a network interface for Internet protocol (IP) communication with the external device, a user input interface configured to receive a control signal from a remote control device, and a controller configured to obtain information on one or more control methods supported by the external device, to select a first control method according to a predetermined priority based on the obtained information, and to control operation of the external device according to the selected first control method. The control method may be a method of controlling operation of the external device and may be any one of an HDMI-CEC method, an IP method or an infrared (IR) method.

According to an embodiment of the present disclosure, as a control method of an external device is dynamically switched in various customer environments, a user does not need to perform separate operation and thus user inconvenience in control of the external device may be greatly improved.

According to an embodiment of the present disclosure, the user can easily control the external device even when they do not know the control method of the external device.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
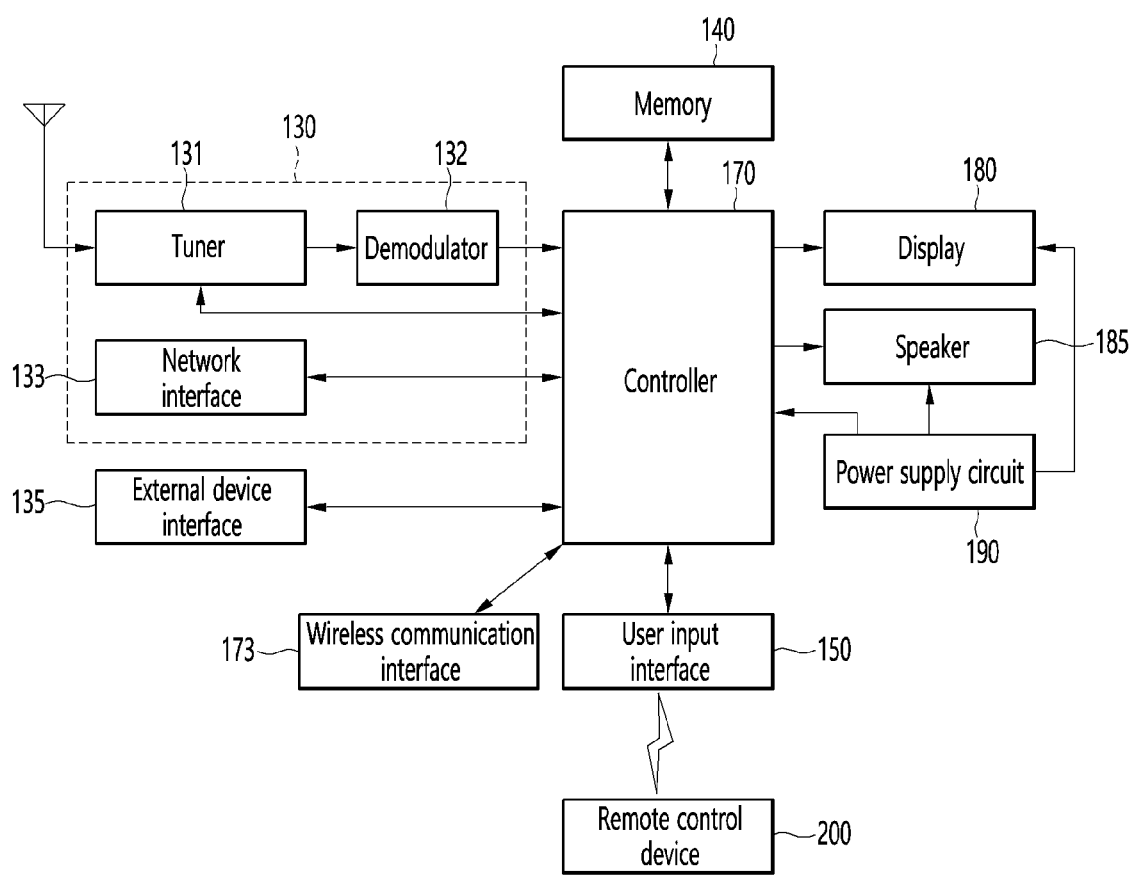
FIG. 1 is a block diagram illustrating a configuration of a display device according to an embodiment of the present disclosure.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may receive one or more of images and audio output from an external device connected to the display device 100 in a wired or wireless manner, and transmit the same to the controller 170. The external device interface 135 may include a plurality of external input terminals.

The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 to 3.

Figure 2:
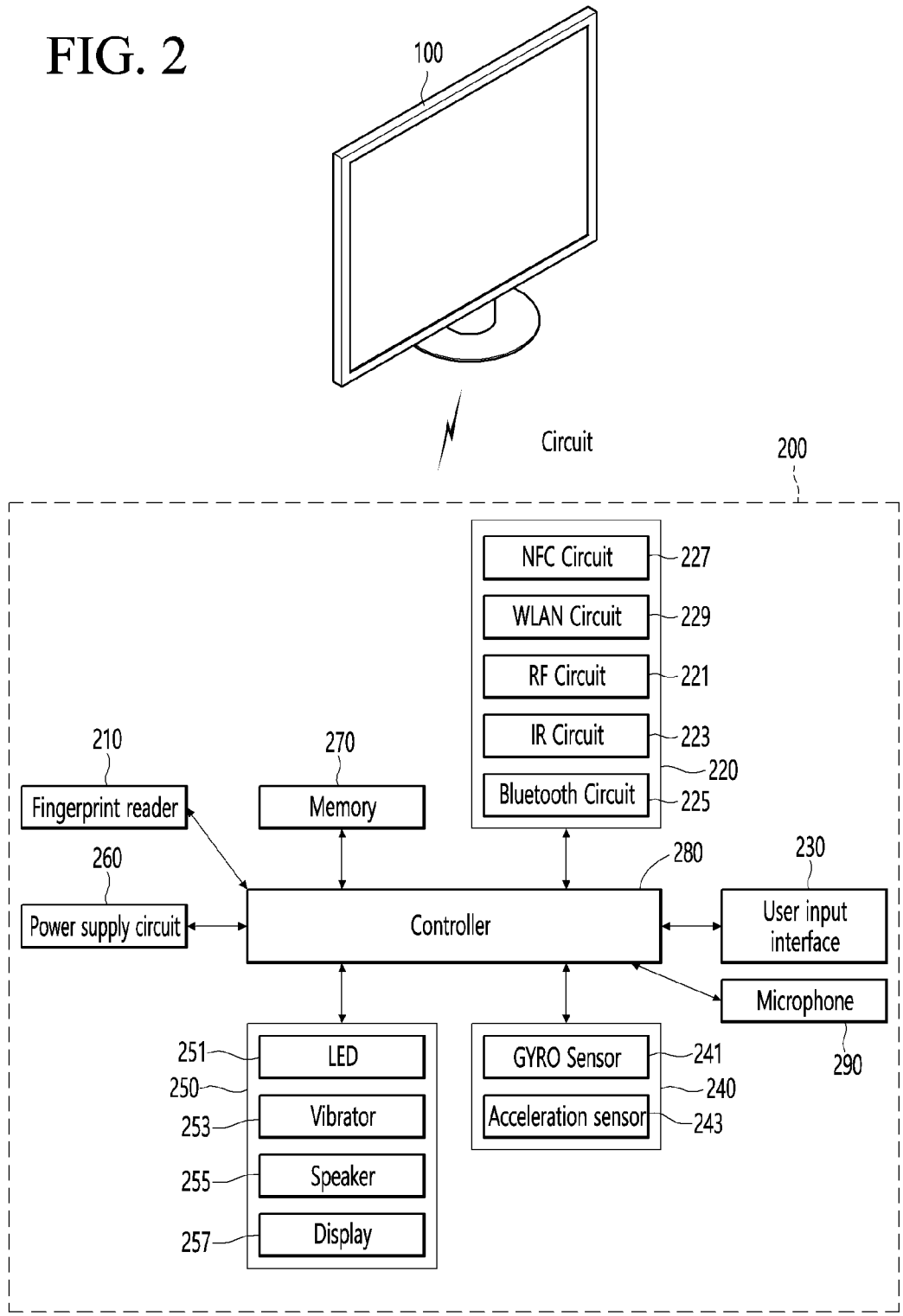
FIG. 2 is a block diagram of a remote control device according to an embodiment of the present disclosure.
Figure 3:
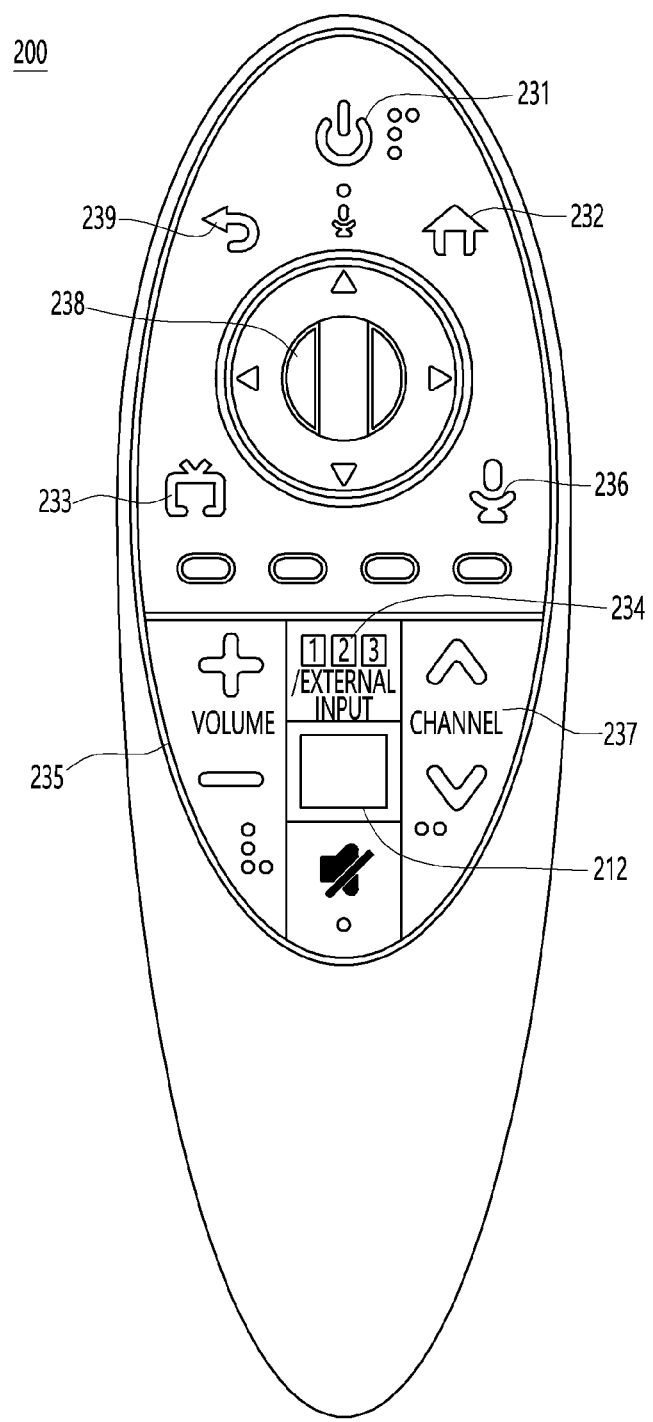
FIG. 3 shows an example of an actual configuration of a remote control device according to an embodiment of the present disclosure.

FIG. 2 is a block diagram of a remote control device according to an embodiment of the present disclosure, and FIG. 3 shows an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device 200 may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication unit 225.

Also, the microphone 290 of the remote control device 200 may obtain a speech.

A plurality of microphones 290 may be provided.

Next, a description will be given referring to FIG. 4.

Figure 4:
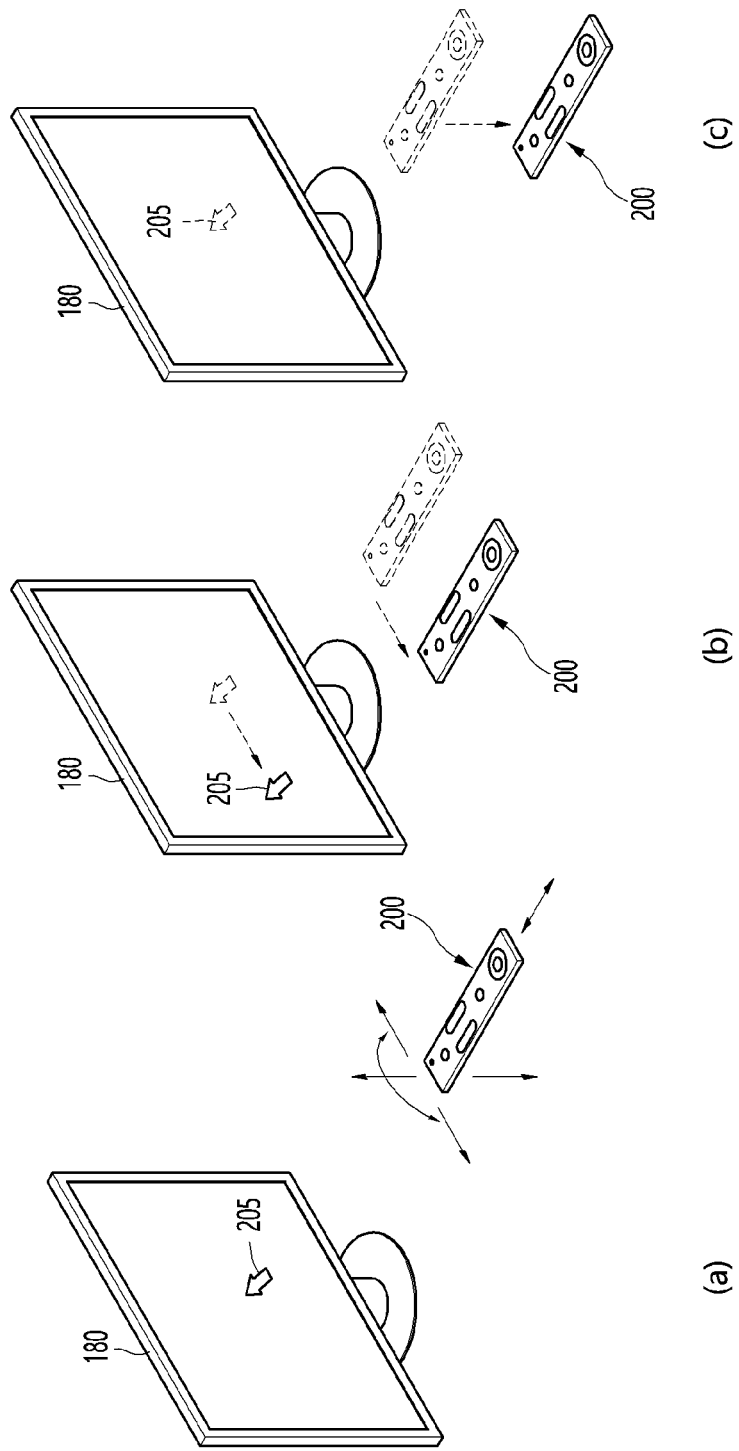
FIG. 4 shows an example of using a remote control device according to an embodiment of the present disclosure.

FIG. 4 shows an example of using a remote control device according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. As shown in the drawings, the pointer 205 is moved and displayed according to movement of the remote control device 200 in a 3D space, so the remote control device 200 may be called a space remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Accordingly, objects of various shapes other than the arrow shape shown in the drawings are possible as the pointer 205. For example, the object may be a concept including a dot, a cursor, a prompt, a thick outline, and the like. In addition, the pointer 205 may be displayed corresponding to any one point among points on a horizontal axis and a vertical axis on the display 180, and may also be displayed corresponding to a plurality of points such as a line and a surface.

Figure 5A:
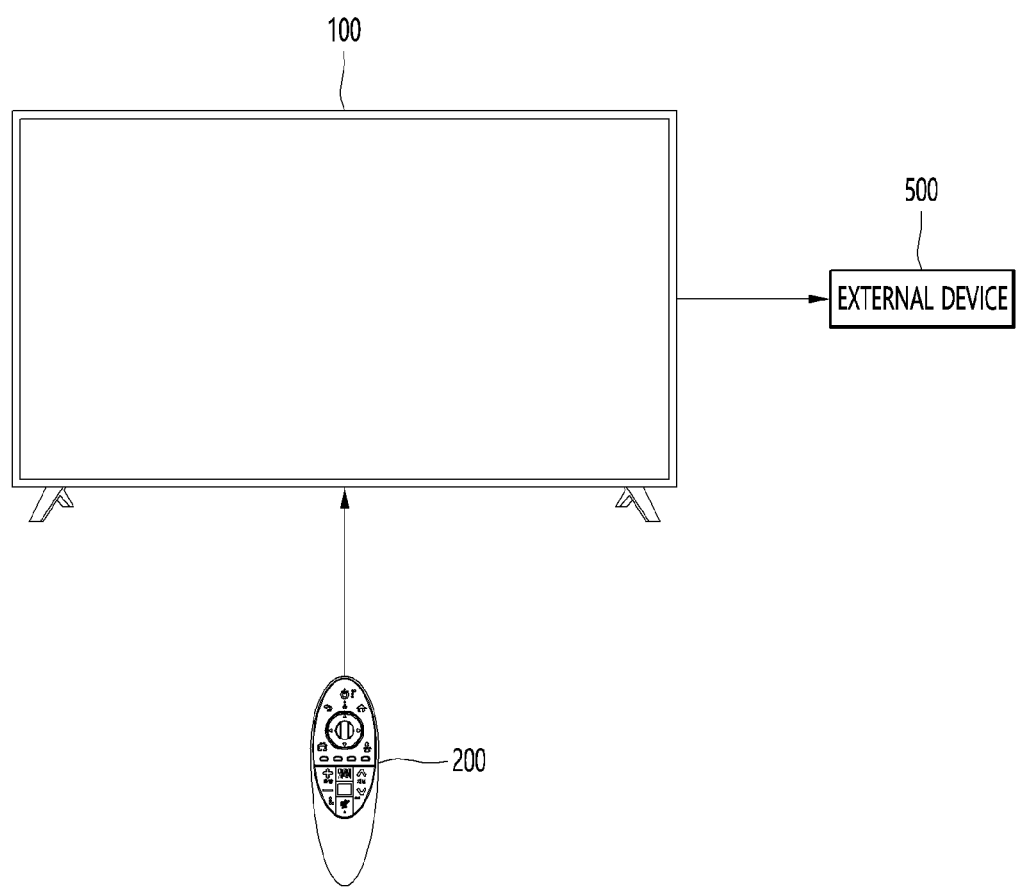
FIGS. 5a to 5c are views illustrating control methods of an external device according to an embodiment of the present disclosure.
Figure 5B:
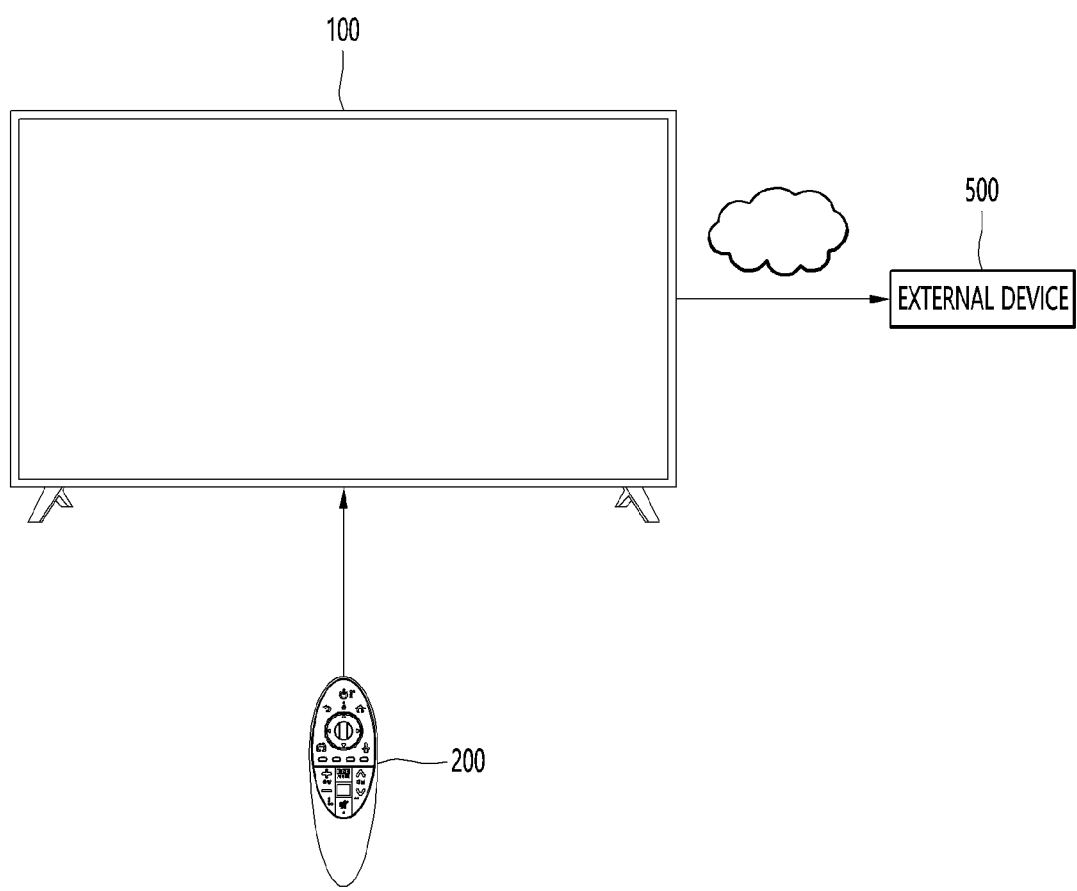
Figure 5C:
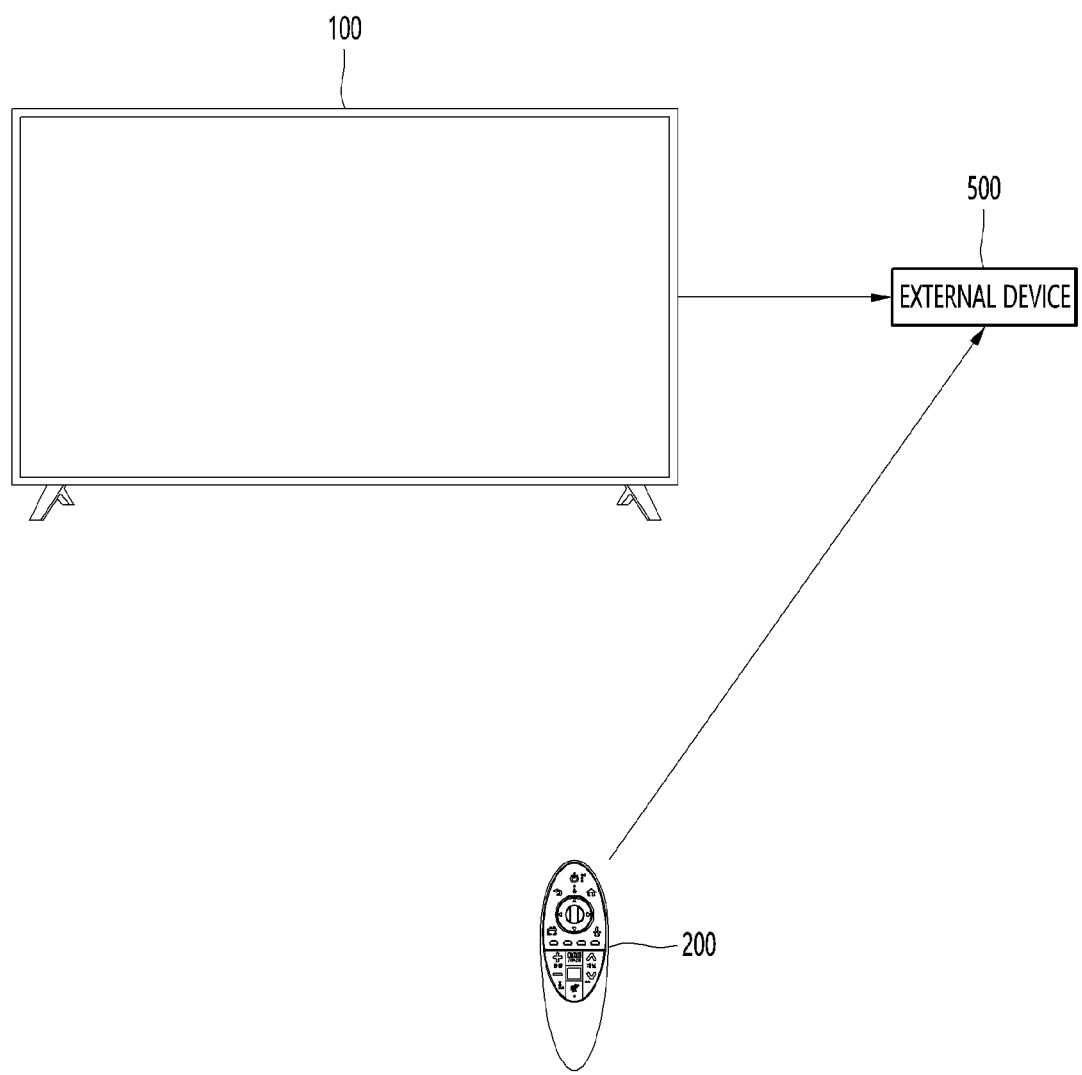

FIGS. 5a to 5c are views illustrating control methods of an external device according to an embodiment of the present disclosure.

Hereinafter, the external device 500 may be any one of a set-top box, a dongle having a set-top box function or a stick providing an over-the-top (OTT) service function for providing various media content through the Internet.

FIG. 5a is a view illustrating an HDMI-CEC method (or CEC method), FIG. 5b is a view illustrating an IP control method, and FIG. 5c is a view illustrating an IR control method.

First, referring to FIG. 5a, the display device 100 and the external device 500 are connected through the external device interface 135. The external device interface 135 may be an HDMI.

The display device 100 may transmit a control command received from the remote control device 200 to the external device 500 through HDMI-CEC, and control the external device 500.

HDMI-CEC may be a function for controlling the external device 500 connected to the display device 100 using the remote control device 200 for controlling the display device 100.

The display device 100 may receive the control command from the remote control device 200 through IR communication or Bluetooth communication and transmit the received control command to the external device 500 through HDMI-CEC. The external device 500 may perform operation according to the control command received from the display device 100.

In case of the CEC method, direction issues representing coincidence of direction between the remote control device 200 and the display device 100 do not occur and various functions are provided through the HDMI-CEC function.

However, in case of the CEC method, a wired cable which is an HDMI cable is required to connect the display device 100 and the external device 500, and there is an issue in non-operation or incorrect operation. In addition, there is a problem that voice control is impossible when a specific soundbar is connected.

Next, FIG. 5b will be described.

Referring to FIG. 5b, the display device 100 may be connected to the external device 500 through the same IP network. That is, the display device 100 and the external device 500 may be connected through the same router.

The display device 100 may transmit the control command received from the remote control device 200 through IR communication or Bluetooth communication to the external device 500 through the router, and the external device 500 may perform operation according to the received control command.

The IP control method has an advantage that there is no direction issue due to a wireless network and it has a wide control range. However, since there are a small number of external devices supporting the IP control method and the same network is used, there is a limitation in the operating environment.

Referring to FIG. 5c, the external device 500 may receive an IR-type control command from the remote control device 200 and perform operation according to the received control command.

In case of the IR control method, there are a large number of external devices supporting the IR control method and a protocol is convenient.

However, since locations where the external device 500 and the remote control device 200 are placed are important, a direction issue occurs and, since infrared rays are used, a control range is short. Therefore, even if the integrated remote control of the remote control device 200 is set, control is incomplete.

Therefore, in the embodiment of the present disclosure, the control method is dynamically switched according to the control situation between the display device 100 and the external device 500.

Figures 6, 7:
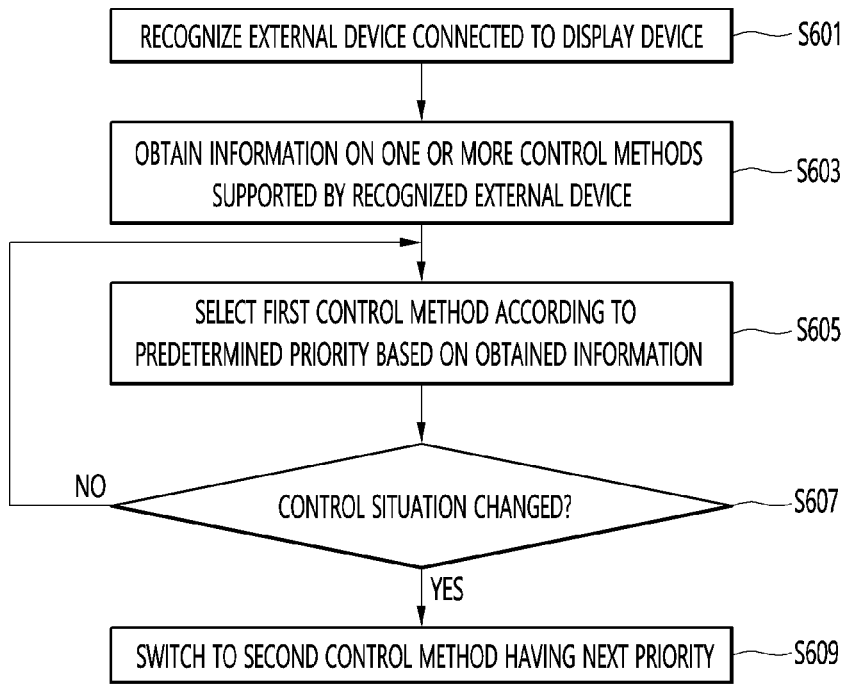
FIG. 6 is a view illustrating an external device control method of a display device according to an embodiment of the present disclosure.
FIG. 7 is a view illustrating methods supported by an external device connected to a display device and priorities of the control methods according to an embodiment of the present disclosure.

FIG. 6 is a view illustrating an external device control method of a display device according to an embodiment of the present disclosure.

Referring to FIG. 6, the controller 170 of the display device 100 recognizes an external device connected to the display device 100 (S601).

The controller 170 may recognize the external device connected through the external device interface 135 or the network interface 133.

The controller 170 may recognize the external device based on a signal received from the external device, when the external device is connected through the external device interface 135.

Recognizing the external device may mean that identification information identifying the external device is obtained.

The controller 170 obtains information on one or more control methods supporting the recognized external device (S603).

The controller 170 may receive information on the control method supported by the external device from the external device, when the external device is connected through an HDMI terminal.

The external device may transmit information on one or more control methods supported thereby through the external device interface 135 of the display device 100 to the display device 100.

The controller 170 selects a first control method according to a predetermined priority from among a plurality of control methods based on the obtained information (S605).

In an embodiment, the plurality of control methods may include the CEC method, the IP control method and the IR control method described with reference to FIGS. 5a to 5c.

The controller 170 may set a priority in order of the CEC method, the IP control method and the IR control method.

However, this is merely an example, and the controller 170 may set the priority of each control method according to the default or user input.

For example, when the external device supports the CEC method and the IP control method, the first control method may be a CEC method with high priority.

As another method, when the external device supports the IP control method and the IR method, the first control method may be an IP control method with high priority.

FIG. 7 is a view illustrating methods supported by an external device connected to a display device and priorities of the control methods according to an embodiment of the present disclosure.

In the priorities of the control methods of the external device, it is assumed that the CEC method has a first priority, the IP has a second priority and the IR method has a third priority.

The type of the external device may be any one of a set-top box (STB) or an OTT type.

Supported control methods may differ between target devices.

When the external device supports the IP control method, any one of a key test or PIN code setting process may be used as an IP control setting process.

The IP control setting process may be a network connection setting process.

The display device 100 may obtain the control method supported by the external device based on information received from the external device, when the external device is connected.

In case of TV A which is a set-top box type, the supported control method is an IP control method and an IR control method. The priority of the IP control method is higher than that of the IR control method.

In case of TV A, the control method may be first set to the IP control method and may be switched to the IR control method when the IP control method becomes impossible.

OTT type Stick B supports the CEC method and the IP control method. The priority of the CEC method is higher than that of the IP control method. Accordingly, in case of Stick B, the control method may be first set to the CEC method and then may be switched to the IP control method when the CEC method becomes impossible.

FIG. 6 will be described again.

The controller 170 determines whether a control situation has been changed after selecting the first control method (S607).

In an embodiment, the controller 170 may determine that the control situation has been changed, when control of the external device becomes impossible using the first control method after selecting the first control method.

For example, the controller 170 may determine that the control situation has been changed, when use of the HDMI-CEC function becomes impossible after selecting the CEC method.

When the control situation is changed, the controller 170 switches the first control method to a second control method having a next priority (S609).

When control of the external device using the first control method becomes impossible, the controller 170 may switch the first control method to the second control method having the next priority.

When the control method is switched, the controller 170 may output a notification indicating that the control method is switched through the display 180.

In this way, the display device 100 may seamlessly perform control of the external device, by dynamically switching the control method.

Therefore, a user may efficiently control the external device without separate manual operation, thereby greatly improving convenience.

Figure 8:
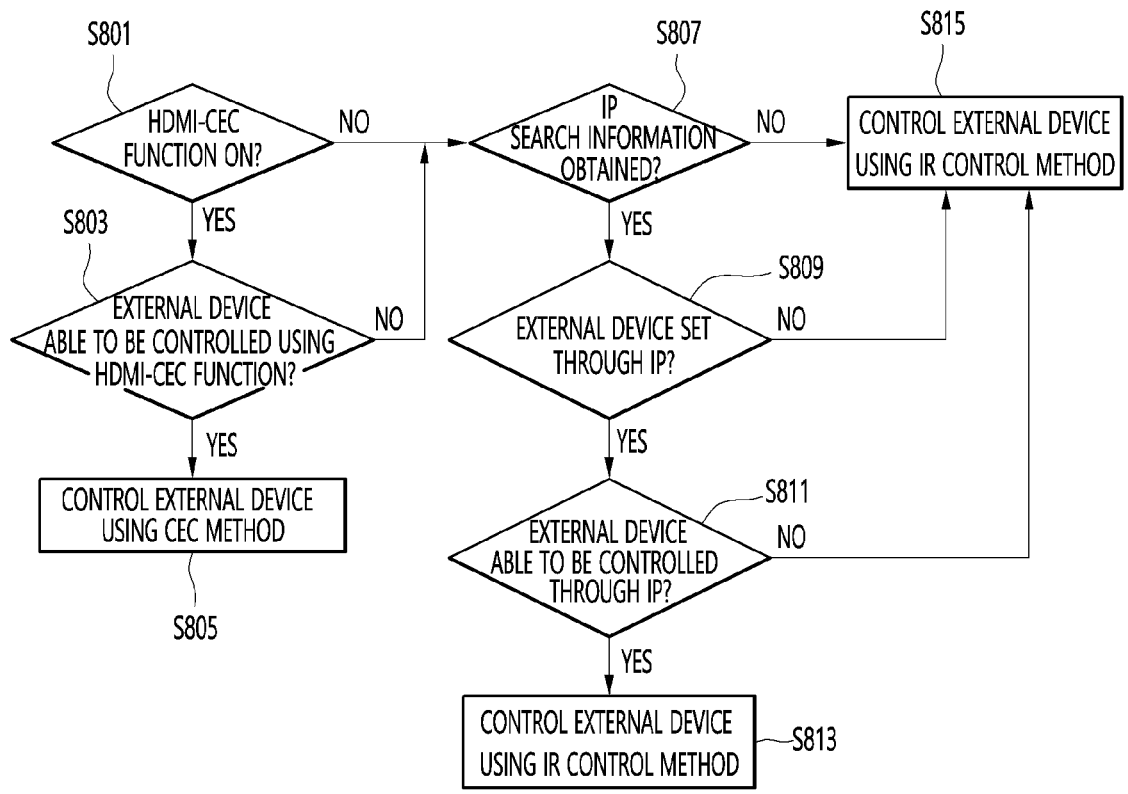
FIG. 8 is a view illustrating an external device control method of a display device according to an embodiment of the present disclosure.

FIG. 8 is a view illustrating an external device control method of a display device according to an embodiment of the present disclosure.

In particular, FIG. 8 is a view embodying steps S605 to S609 of FIG. 6.

Referring to FIG. 8, when the external device is connected through an HDMI terminal, the controller 170 determines whether an HDMI-CEC function is turned on (S801).

The HDMI-CEC function may be turned on or off according to user input.

When the HDMI-CEC function is turned on, the controller 170 determines whether control of the external device using the HDMI-CEC function is possible (S803).

In an embodiment, the controller 170 may transmit a CEC command to the external device and determine whether control of the external device using the HDMI-CEC function is possible when a response corresponding to the CEC command is received from the external device.

The controller 170 may transmit a CEC command to the external device and determine whether control of the external device using the HDMI-CEC function is impossible when a response corresponding to the CEC command is not received from the external device.

This will be described with reference to FIGS. 9 and 10.

Figure 9:
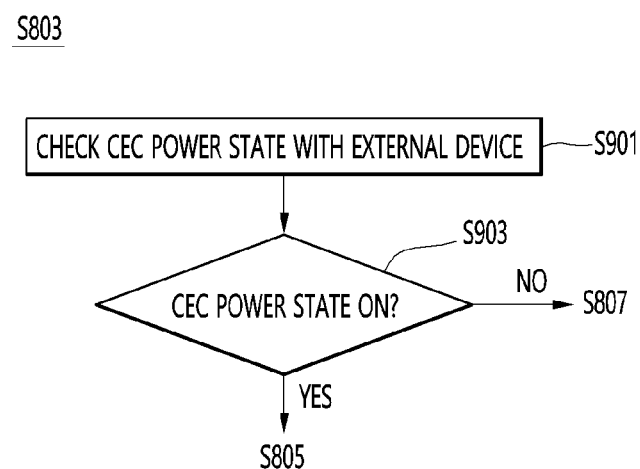
FIGS. 9 and 10 are views illustrating a method of determining whether control of the external device using the HDMI-CEC function is possible according to an embodiment of the present disclosure.
Figure 10:
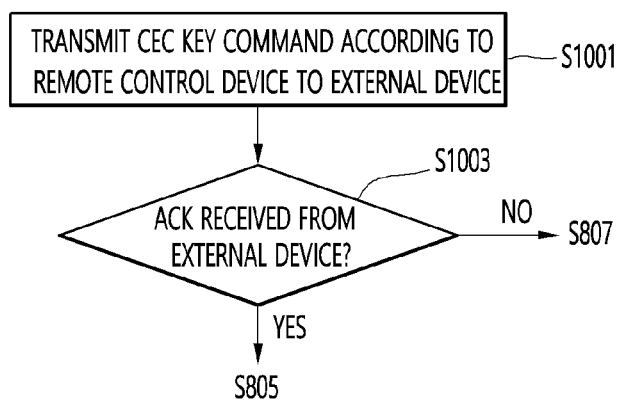

FIGS. 9 and 10 are views illustrating a method of determining whether control of the external device using the HDMI-CEC function is possible according to an embodiment of the present disclosure.

Referring to FIG. 9, the controller 170 checks a CEC power state with the external device (S901).

The controller 170 may check the CEC power state at a predetermined time period. The predetermined time may be 5 minutes, but this is only an example.

The CEC power state may be a state indicating whether operation according to the CEC control command transmitted by the display device 100 may be performed.

When the CEC power state is an ON state, the external device may perform operation according to the CEC control command transmitted by the display device 100.

When the CEC power state is an OFF state, the external device may not perform operation according to the CEC control command transmitted by the display device 100.

The controller 170 performs S805 upon determining that the CEC power state is an ON state and performs S807 upon determining that the CEC power state is an OFF state.

Next, FIG. 10 will be described.

The controller 170 transmits a CEC key command according to an operation command received from the remote control device 200 to the external device (S1001).

The operation command may correspond to selection of a key provided in the remote control device 200.

The controller 170 performs S805 when a response (Ack) signal is received from the external device in response to the CEC key command, and performs S807 when the response signal is not received within the predetermined time.

In another embodiment, the controller 170 may transmit the same CEC key command to the external device when the response signal is not received within the predetermined time, and performs S807 when the response signal is not received within the predetermined time.

FIG. 8 will be described again.

Upon determining that control of the external device using the HDMI-CEC function is possible, the controller 170 controls the external device using the CEC method (S805).

When the HDMI-CEC function is turned off (S801) or upon determining that control of the control device using the HDMI-CEC function is impossible (S803), the controller 170 determines whether IP search information is obtained to determine whether the IP control method is possible (S807).

In an embodiment, the IP search information may be necessary to access the same IP network as the external device. The IP search information may include an identifier and password of the router.

Meanwhile, upon determining that control of the external device using the CEC method is impossible, the controller 170 may display a popup window for prompting IP setting of the external device on the display 180.

When the IP search information is obtained, the controller 170 determines whether the external device is set through the IP (S809).

The controller 170 may determine whether connection with the external device is set in the same router.

When the external device is set through the IP, the controller 170 determines whether control of the external device is possible (S811).

The controller 170 may transmit a test signal to the external device through the IP network and determine whether control of the external device through IP is possible based on the test signal.

In an embodiment, when the network is disconnected or the external device does not respond to the control command, the controller 170 may determine that IP control is impossible.

This will be described with reference to FIGS. 11 and 12.

Figure 11:
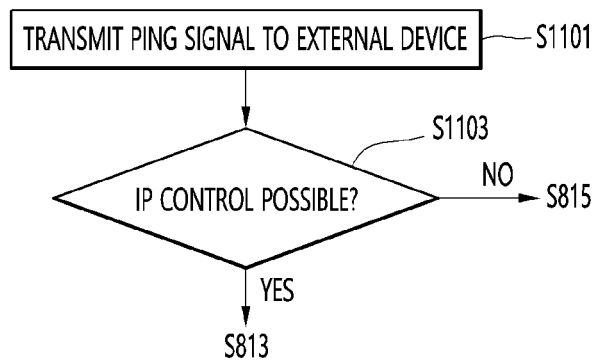
FIGS. 11 and 12 are views illustrating a method of determining whether control of the external device through the IP control method is possible according to an embodiment of the present disclosure.
Figure 12:
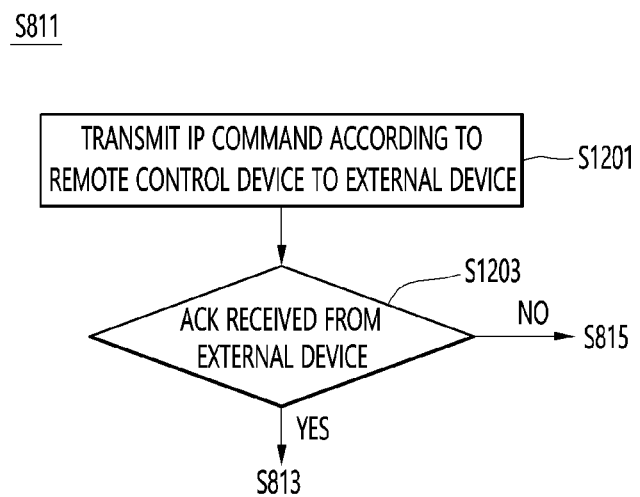

FIGS. 11 and 12 are views illustrating a method of determining whether control of the external device through the IP control method is possible according to an embodiment of the present disclosure.

Referring to FIG. 11, the controller 170 transmits a Ping signal to the external device through the network interface 133 (S1101).

The controller 170 may transmit the Ping signal to the external device through the router. The controller 170 may transmit the Ping signal to the external device at a predetermined time period.

The controller 170 determines whether the external device is able to be controlled through the IP based on the Ping signal (S1103).

When a response signal corresponding to the Ping signal is received from the external device within the predetermined time, the controller 170 may determine that the external device is able to be controlled through the IP.

When the response signal corresponding to the Ping signal is not received from the external device within the predetermined time, the controller 170 may determine that the external device is not able to be controlled through the IP.

The controller 170 may transmit the Ping signal three times at an interval of 5 seconds and may determine that the external device is not able to be controlled through the IP when the response signal to the Ping signal transmitted three times is not received.

The controller 170 may transmit the Ping signal three times at an interval of 5 seconds and may determine that the external device is not able to be controlled through the IP when the response signal to the Ping signal transmitted three times is not received at least once.

The controller 170 performs S813 upon determining that control of the external device through the IP is possible, and performs S815 upon determining that control through the IP is impossible.

Meanwhile, when the external device is able to be controlled using the IP control method in a state of switching to the IP control method, the controller 170 may switch the IP control method back to the CEC method.

Next, FIG. 12 will be described.

The controller 170 transmits an IP command according to the operation command of the remote control device 200 to the external device (S1201).

The controller 170 may receive the operation command from the remote control device 200 through the user input interface 150. The operation command may be a key command for selecting a button provided in the remote control device 200.

The controller 170 may transmit the IP command corresponding to the operation command to the external device through the network interface 133.

The controller 170 determines whether a response signal (Ack) signal is received from the external device in response to the IP command (S1203).

The controller 170 may determine whether the response signal is received within the predetermined time.

The controller 170 performs step S1203 when the response signal is received and performs S815 when the response signal is not received.

When the response signal is received within the predetermined time, the controller 170 may determine that IP control is possible.

When the response signal is not received within the predetermined time, the controller 170 may determine that IP control is impossible. In this case, the controller 170 may switch the control method of the external device to the IR control method.

FIG. 8 will be described again.

Upon determining that control of the external device through the IP is possible, the controller 170 controls the external device using the IP control method (S813).

The controller 170 may transmit a control command according to the signal received from the remote control device 200 to the external device through the IP and control operation of the external device.

When the IP search information is not obtained (S807), when the external device is not set through the IP (S809) or upon determining that control of the external device through the IP is impossible, the controller 170 controls the external device using the IP control method (S815).

Meanwhile, when the external device is able to be controlled using the IP control method in a state of switching to the IR control method, the controller 170 may switch the IR control method back to the IP method.

That is, the display device 100 may switch to a control method having higher priority among the control methods supported by the external device based on a control situation.

Figure 13:
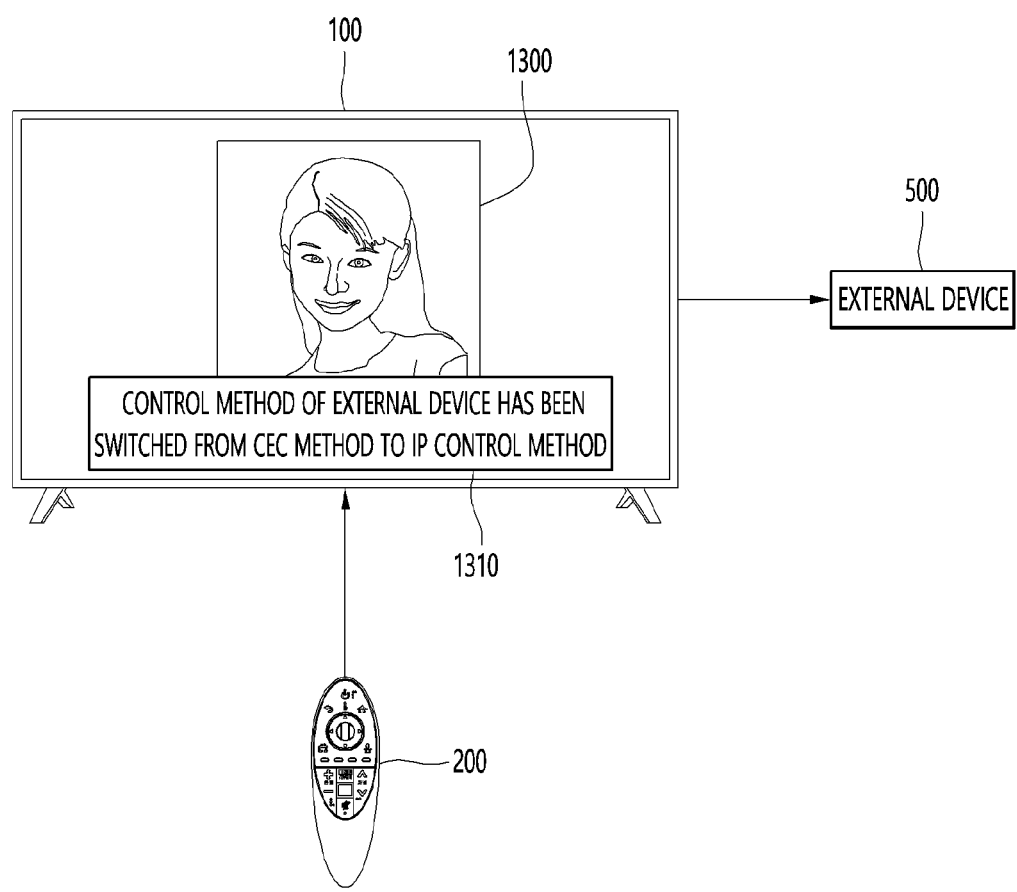
FIG. 13 is a view illustrating an example of outputting a notification indicating that a control method of an external device has been changed according to an embodiment of the present disclosure.

FIG. 13 is a view illustrating an example of outputting a notification indicating that a control method of an external device has been changed according to an embodiment of the present disclosure.

In FIG. 13, it is assumed that the external device 500 supports the CEC method and the IP control method and is controlled using the CEC method.

When detecting a situation that control cannot be performed using the CEC method, the display device 100 may switch the control method of the external device 500 from the CEC method to the IP control method.

At the same time, the display device 100 may output a notification 1310 indicating that the control method of the external device 500 has been switched from the CEC method to the IP control method on the display 180.

The display device 100 may display the notification 1310 on the display 180 while reproducing a content image 1300.

Since the control method of the external device 500 is automatically switched, the separate user operation is not necessary.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:

1. A display device comprising:
    a display;
    an external device interface configured to provide a high definition multimedia interface- consumer electronic control (HDMI-CEC) function with an external device;
    a network interface for Internet protocol (IP) communication with the external device;
    a user input interface configured to receive a control signal from a remote control device; and
    a controller configured to obtain information on one or more control methods supported by the external device, to select a first control method according to a predetermined priority based on the obtained information, and to control operation of the external device according to the selected first control method,
    wherein the control method is a method of controlling the operation of the external device and is any one of an HDMI-CEC method, an IP method or an infrared (IR) method,
    wherein the controller is further configured to switch the first control method to a second control method having a next priority, when controlling the operation of the external device according to the first control method becomes impossible after selecting the first control method, and to display, on the display, a notification indicating that the first control method has been switched to the second control method,
    wherein the controller is further configured to select the HDMI-CEC method as the first control method, when the one or more control methods supported by the external device are the HDMI-CEC method, the IP method and the IR method,
    wherein the controller switches the HDMI-CEC method to the IP method having a next priority, when the HDMI-CEC function is turned on and upon determining that controlling the operation of the external device is impossible according to the HDMI-CEC method, and
    wherein the controller is further configured to transmit a Ping signal to the external device through the network interface and to switch the HDMI-CEC method to the IP method having a next priority upon determining that controlling the operation of the external device is possible based on the Ping signal.

2. The display device of claim 1, wherein the controller is further configured to switch the second control method back to the first control method, when controlling the operation of the external device according to the first control method becomes possible after switching to the second control method.

3. The display device of claim 1, wherein the controller is further configured to obtain the information on the one or more control methods supported by the external device from the external device through the external device interface.

4. The display device of claim 1, wherein the predetermined priority is set in order of the HDMI-CEC method, the IP method and the IR method.

5. The display device of claim 1, wherein the controller is further configured to select the HDMI-CEC method as the first control method, when the HDMI- CEC function is turned on and upon determining that controlling the operation of the external device is possible according to the HDMI-CEC method.

6. The display device of claim 5, wherein the controller is further configured to check a CEC power state of the external device and to determine whether controlling the operation of the external device is possible according to the HDMI-CEC method.

7. The display device of claim 5, wherein the controller is further configured to transmit, to the external device, a control command according to a key command received from the remote control device and to determine that controlling the operation of the external device is possible according to the HDMI-CEC method when a response signal responding to the control command is received.

8. The display device of claim 1, wherein the controller is further configured to transmit, to the external device, an IP command responding to a key command received from the remote control device through the network interface, and to switch the HDMI-CEC method to the IP method having a next priority when a response signal responding to the IP command is received.

9. The display device of claim 1, wherein the controller is further configured to receive a command from the remote control device through IR communication or Bluetooth communication.

10. A method of operating a display device for controlling an external device, the method comprising:
   obtaining information on one or more control methods supported by the external device;
   selecting a first control method according to a predetermined priority based on the obtained information;
   controlling operation of the external device according to the selected first control method,
   wherein the control method is a method of controlling the operation of the external device and is any one of a High Definition Multimedia Interface-Consumer Electronic Control (HDMI-CEC) method, an IP method or an infrared (IR) method;
   switching the first control method to a second control method having a next priority, when controlling the operation of the external device according to the first control method becomes impossible after selecting the first control method;
   displaying, on a display, a notification indicating that the first control method has been switched to the second control method;
   selecting the HDMI-CEC method as the first control method, when the one or more control methods supported by the external device are the HDMI-CEC method, the IP method and the IR method;
   switching the HDMI-CEC method to the IP method having a next priority, when the HDMI-CEC function is turned on and upon determining that controlling the operation of the external device is impossible according to the HDMI-CEC method; and
   transmitting a Ping signal to the external device through the network interface and switching the HDMI-CEC method to the IP method having a next priority upon determining that controlling the operation of the external device is possible based on the Ping signal.

11. The method of claim 10, further comprising switching the second control method back to the first control method, when controlling the operation of the external device according to the first control method becomes possible after switching to the second control method.

12. The method of claim 10, wherein the obtaining the information on the one or more control methods comprises obtaining the information on the one or more control methods supported by the external device from the external device through an external device interface.

13. The method of claim 10, wherein the predetermined priority is set in order of the HDMI-CEC method, the IP method and the IR method.

14. A display device comprising:
   an external device interface configured to provide a high definition multimedia interface-consumer electronic control (HDMI-CEC) function with an external device;
   a network interface for Internet protocol (IP) communication with the external device;
   a user input interface configured to receive a control signal from a remote control device; and
   a controller configured to obtain information on one or more control methods supported by the external device, to select a first control method according to a predetermined priority based on the obtained information, and to control operation of the external device according to the selected first control method,
   wherein the control method is a method of controlling operation of the external device and is any one of an HDMI-CEC method, an IP method or an infrared (IR) method,
   wherein the controller is further configured to select the HDMI-CEC method as the first control method, when the one or more control methods supported by the external device are the HDMI-CEC method, the IP method and the IR method,
   wherein the controller switches the HDMI-CEC method to the IP method having a next priority, when the HDMI-CEC function is turned on and upon determining that controlling the operation of the external device is impossible according to the HDMI-CEC method, and
   wherein the controller is further configured to transmit, to the external device, an IP command responding to a key command received from the remote control device through the network interface, and to switch the HDMI-CEC method to the IP method having a next priority when a response signal responding to the IP command is received.

* * * * *